United States Patent
Dempsey et al.

(10) Patent No.: US 6,345,271 B1
(45) Date of Patent: Feb. 5, 2002

(54) METHOD AND APPARATUS FOR TRANSFORMING QUERIES

(75) Inventors: Richard L. Dempsey, Los Gatos; Denice A. DeSimone, San Jose; Anne C. Fockler, San Jose; Tri Q. Ha, San Jose; Mimi P. Vo, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,291

(22) Filed: Nov. 25, 1998

(51) Int. Cl.[7] .............................. G06F 17/30; G06F 7/00
(52) U.S. Cl. ............................................ 707/4; 707/5
(58) Field of Search .............................. 707/1, 3–6, 10

(56) References Cited

U.S. PATENT DOCUMENTS

| | | | | |
|---|---|---|---|---|
| 4,829,427 A | | 5/1989 | Green ........................... | 707/4 |
| 5,367,675 A | * | 11/1994 | Cheng ......................... | 395/600 |
| 5,471,622 A | * | 11/1995 | Eadline ........................ | 707/3 |
| 5,548,754 A | | 8/1996 | Pirahesh et al. ............... | 707/2 |
| 5,548,758 A | | 8/1996 | Pirahesh et al. ............... | 707/2 |
| 5,590,319 A | | 12/1996 | Cohen et al. .................. | 707/4 |
| 5,732,258 A | | 3/1998 | Jakobsson et al. ............. | 707/4 |
| 5,761,657 A | * | 6/1998 | Hoang .......................... | 707/4 |
| 5,822,750 A | * | 10/1998 | Jou et al. ...................... | 707/2 |
| 5,864,840 A | * | 1/1999 | Leung et al. .................. | 707/2 |
| 5,873,080 A | * | 2/1999 | Coden .......................... | 707/3 |
| 5,966,704 A | * | 10/1999 | Furegati et al. ............... | 707/3 |
| 5,987,446 A | * | 11/1999 | Corey et al. .................. | 707/3 |
| 5,991,756 A | * | 11/1999 | Wu ............................... | 707/3 |
| 6,006,214 A | * | 12/1999 | Carey et al. .................. | 707/2 |
| 6,012,053 A | * | 1/2000 | Pant et al. .................... | 707/3 |
| 6,032,143 A | * | 2/2000 | Leung et al. .................. | 707/2 |
| 6,081,801 A | * | 6/2000 | Cochrane ...................... | 707/3 |

OTHER PUBLICATIONS

S. Adah, C. Bufi, Y. Temtanapat, Integrated Search Engine, *Proceedings. 1997 IEEE Knowledge and Data Engineering Exchange Workshop*, published Los Alamitos, CA, USA, 1997, (1 pg Abstract).

AA Tsinakos, KG Margaritiz, Mentor: Internet Search Advisor and Information Retrieval System, *WebNet 96—World Conference of the Web Society. Proceedings*, published:Charlottesville, VA, USA, 1996, (1 pg Abstract).

H. Tros, W. Heinz, J Matiasek and E. Buchberger, Datenbank–Dialog and the Relevance of Habitability, *Third Conference on Applied Natural Language Processing. Proceedings of the Conference*, published Morristown, NJ, USA, 1992, (1pg Abstract).

* cited by examiner

*Primary Examiner*—John Breene
*Assistant Examiner*—David J. Robinson
(74) *Attorney, Agent, or Firm*—Gates & Cooper LLP (57) ABSTRACT

A method, apparatus, article of manufacture, and a memory structure for transforming a query to reduce the need for merging the results from a number of result lists. The method comprises the steps of forming at least one subquery from the query, executing the formed subquery to generate a result list comprising a plurality of first result elements, and replacing the executed subquery with a logical combination of the first result elements to form a transformed query. The apparatus comprises a means for forming at least one subquery from the query, a means for executing the formed subquery to generate a plurality of first result elements, and a means for replacing the executed subquery with a logical combination of the first result elements to form a transformed query. In one embodiment, the invention comprises a program storage device, tangibly embodying a sequence of instructions for performing the method steps described above.

24 Claims, 10 Drawing Sheets

METHOD AND APPARATUS FOR TRANSFORMING QUERIES

BACKGROUND OF THE INVENTION

1. Field of the Invention

The present invention relates to digital computer systems and more particularly to database systems implemented in digital computer systems and to systems and methods for transforming database queries.

2. Description of the Related Art

Database management systems are computer-based systems that allow users to store, retrieve, search, and otherwise manage large volumes of data. One of the key advantages in maintaining a database is the ability to search the database to find data entries complying with a user-defined search criteria. This feature is accomplished with a database operation commonly known as a query. Databases typically contain large numbers of data and a given query may require a combination of information from different data records which are sometimes stored in different servers. Many databases employ specialized search engines to improve database search performance.

Many techniques have evolved to help locate data stored in databases. One of these techniques involves the launching of multiple queries on specialized search engines, then combining the result lists from the multiple queries to derive the search result.

While this technique is useful, the management of the multiple result lists from the various search engines has become a challenge, especially when the desired result is a single result list with all redundancies removed. The process of merging the results from a number of result lists can take as long as the query itself, and can result in large demands on computer resources, particularly buffer storage space.

What is needed is a search technique that allows queries to be defined and transmitted to specialized search engines, but avoids the need to merge the results from a large number of result lists. The present invention satisfies that need by presenting a method and apparatus for transforming the database query to reduce or eliminating the need to merge data. The present invention satisfies that need.

SUMMARY OF THE INVENTION

To address the requirements described above, the present invention discloses a method, apparatus, and article of manufacture for transforming a query to reduce the need for merging the results from a number of result lists.

The method comprises the steps of forming at least one subquery from the query, executing the formed subquery to generate a result list comprising a plurality of first result elements, and replacing the executed subquery with a logical combination of the first result elements to form a transformed query. In one embodiment of the invention, the query comprises a number of search terms, and the step of forming a subquery comprises the steps of scanning the query to identify search terms targeted for a search engine, tagging the identified search terms with unique identifiers, and forming the subquery from the tagged search terms. In another embodiment, the tagged search terms are those which are targeted for specialized search engines, such as those optimized for text searching or image analysis, and the tag and unique identifier associated with each search term provides an indication of the specialized search engine the search term is targeted to. In another embodiment of the invention, substitution of result elements for subqueries proceeds in cascaded fashion by combining the result elements with a remaining subquery, one at a time to generate iterated result elements. This process is completed until all subqueries in the query have been processed. In another embodiment of the invention, substitution of the result elements for subqueries proceeds in parallel.

In accordance with the foregoing, the present invention also comprises an apparatus having a means for forming at least one subquery from the query, a means for executing the formed subquery to generate a plurality of first result elements, and a means for replacing the executed subquery with a logical combination of the first result elements to form a transformed query. In another embodiment, the invention comprises a program storage device, tangibly embodying a sequence of instructions for performing the method steps described above.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
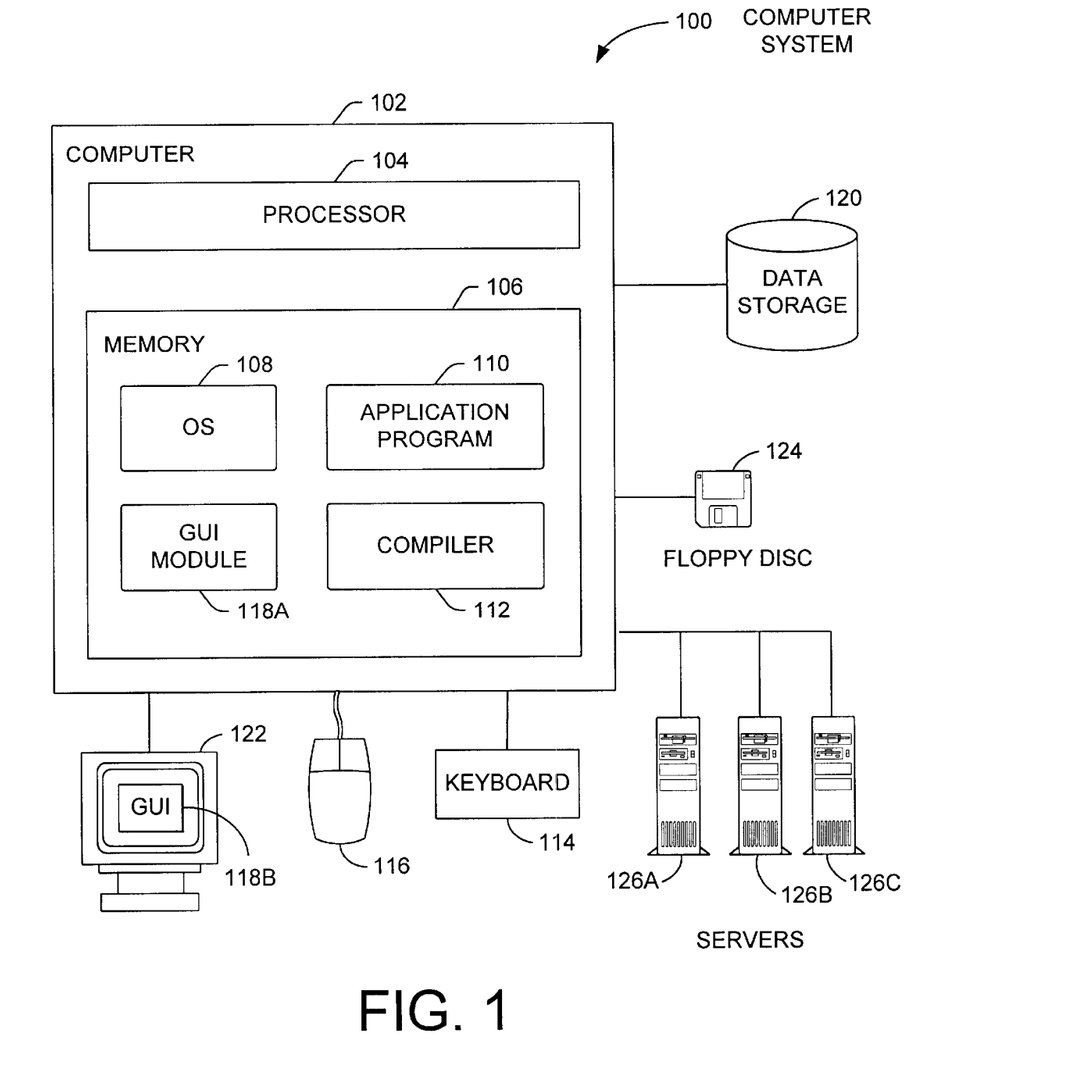
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

First server 126A, second server 126B, and third server 126C (collectively referred to hereinafter as servers 126) are communicatively coupled to the computer 102, each implementing one or more search engines that can be used to find data according to a data search request, such as that which is typically specified in accordance with the structured query language (SQL). For example, server 126A may implement a specialized search engine optimized for performing text searches, while server 126B may implement a specialized search engine optimized for performing image analysis and searching, and server 126C may be a Z39.50 protocol-compliant server, as is used in many library indexing applications.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Process

Figure 2:
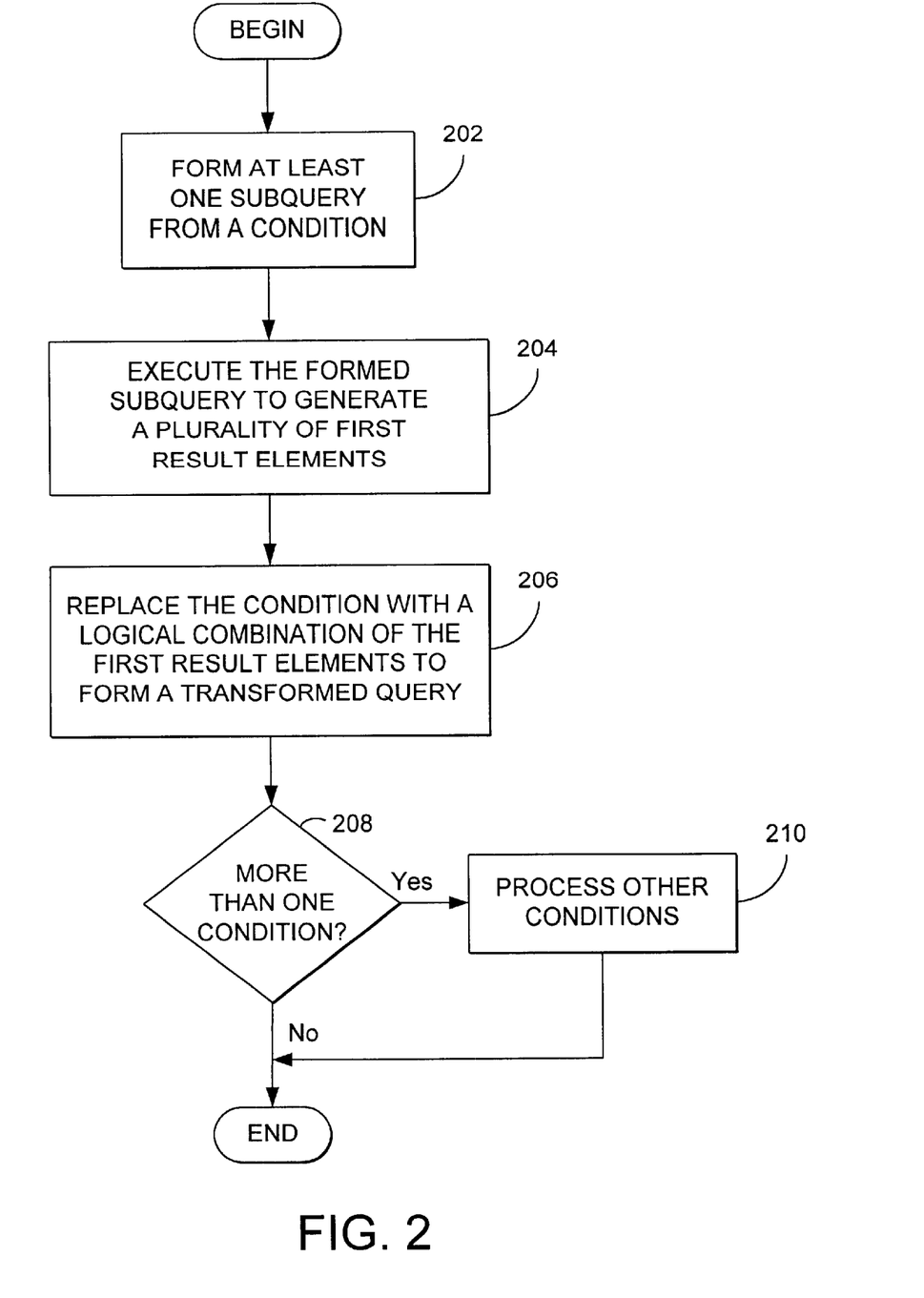
FIG. 2 is a flow chart presenting an illustrative example of process steps used in transforming a query.
Figure 3A:
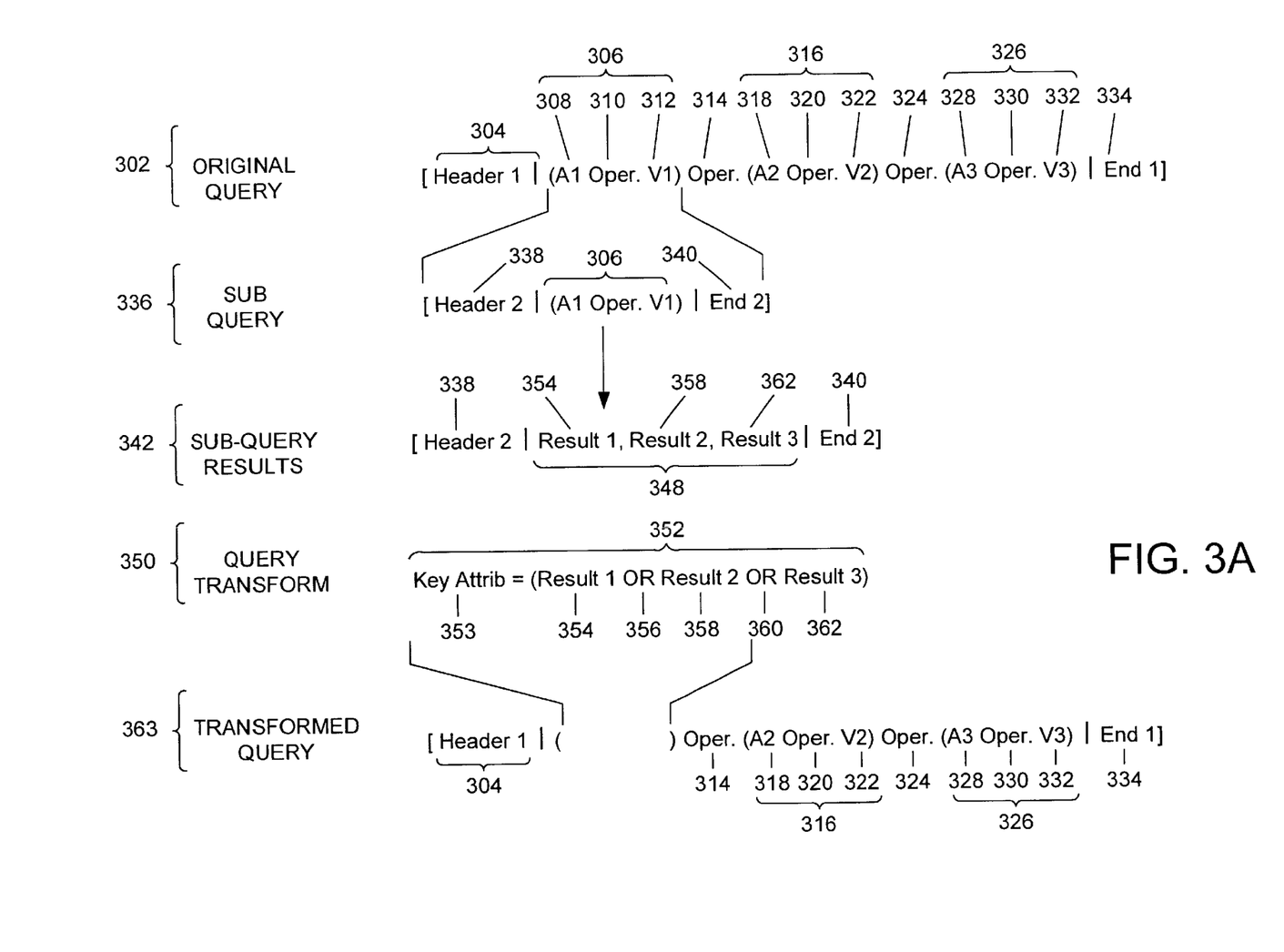
FIG. 3A is a diagram presenting an illustration of the transformation of a query according to the present invention.

FIG. 2 is a flow chart showing the operations used to practice one embodiment of the present invention, and FIG. 3A presents a diagram showing an example of the transformation of a query. The process begins by forming 202 one or more subqueries 336 from the original query 302. The query 302 comprises a header 304, an end statement 334, and a plurality of conditions, including first condition 306, second condition 316, and third condition 326. Each of the conditions comprises a plurality of search terms which can be categorized as attributes (including attributes A1 308 A2 318, and A3 328), operators (including operators 310, 320, and 330), and values (V1 312, V2 322, and V3 332). The subquery 336 comprises a header 338, a condition (illustrated as the first condition 306), and an end statement 340. If necessary, subqueries are may also be formed for the remaining conditions 316 and 326 at this time.

Next, the formed subquery 336 is executed 204 to generate a subquery result 342, including result list 348 comprising a plurality of result elements 354, 358, and 362. In one embodiment, each subquery is analyzed to determine if it is targeted to a specialized search engine. If so, the subquery is transmitted to the specialized search engine for execution. For example, subquery 306 may require significant image processing, in which case, the subquery may be transferred to a search engine supporting image processing.

Next, the condition which resulted was used to generate the executed subquery is replaced 206 with a logical combination of the first result elements 354, 358, and 362 to form a transformed query 363. In the illustrated embodiment, the results are logically combined in accordance with logical OR operators 356, and 360 and a key attribute 353. Keys are fields or columns in a database record that hold unique data that identifies the record from all other records in the file or database. Typical key fields are account numbers, product codes, and customer names. The use of the key attribute 353 in the result list allows the results from the first subquery to be combined with the results of other subqueries.

If more than one condition is to be translated into a subquery 336, these other conditions are processed according to the cascading or parallel processes described below to form the final transformed query. This is depicted in blocks 208 and 210. Additional details regarding the translation into additional subqueries and the formation of the transformed query is presented in FIG. 5 through FIG. 8 and the accompanying text.

Figure 3B:
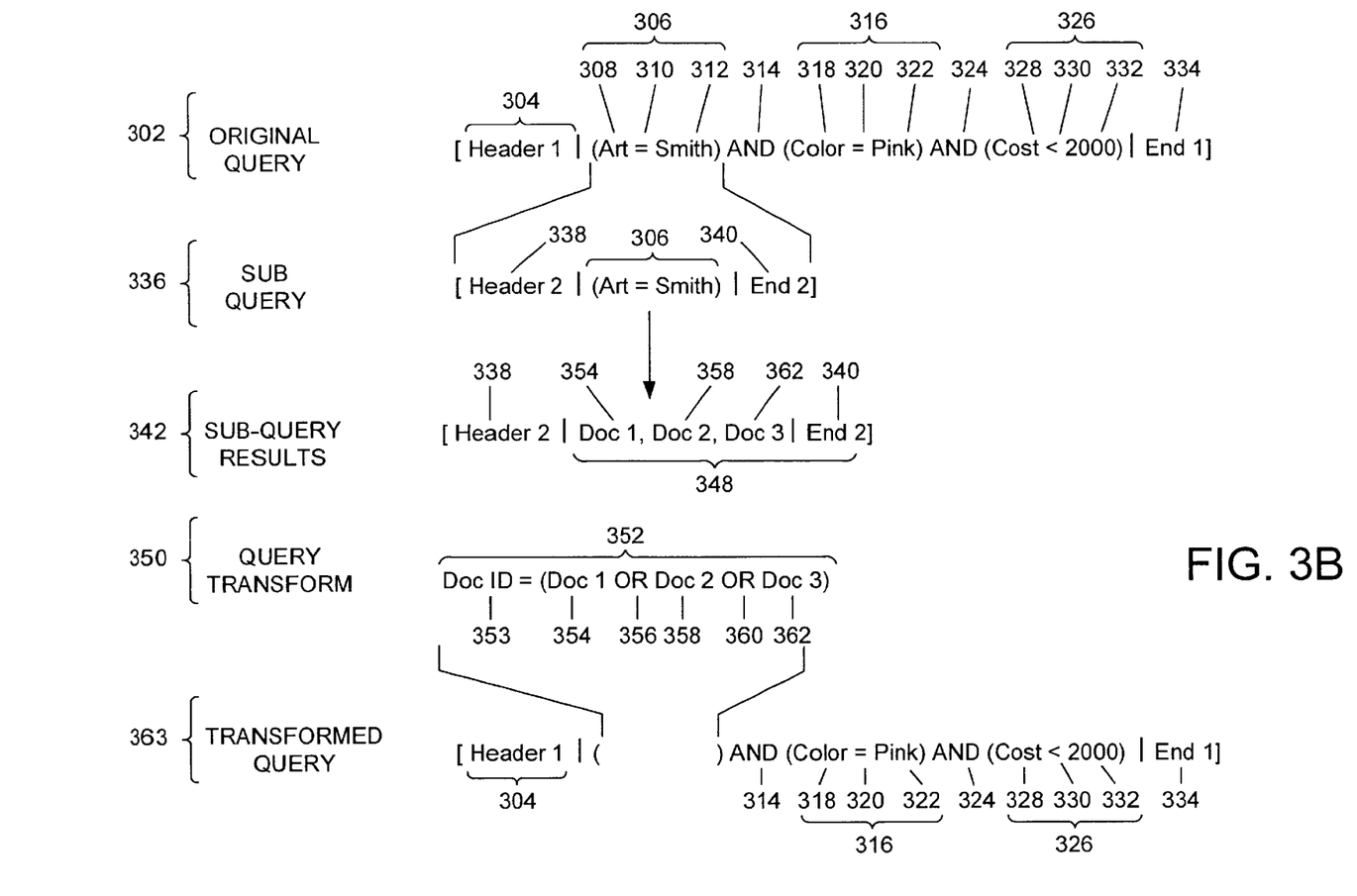
FIG. 3B is a diagram presenting an example of a query transformation.

FIG. 3B is a diagram showing a specific example of the operations depicted in FIGS. 2 and 3A. In this example, the user would like to find pink sculptural items produced by all artists named Smith that cost less than $2,000. The user has developed a query 302 to request this search. Query 302 includes a first condition 306, a second condition 316, and a third condition 326. The first condition 306 is targeted for a textural search engine, and asks the server 126 to find records in which the Artist's name is Smith. The second condition 316 is targeted for a search engine that is suited for performing image processing, and asks the server 126 to find records in which the color of the sculpture is pink. The third search condition 326 is targeted for a Z39.50-compliant server, and asks the server 126 to find records in which the cost of the sculpture is less than $2,000.

A subquery 336 is formed from the original query 302. The subquery 336 is executed on a first server 126A, which provides a text search engine. The text search engine returns a result list 348 comprising result elements 354, 358, and 362. In the illustrated example, the result elements are document numbers, which are instances of the key attribute "Doc ID." A logical combination of the result elements 354, 358, and 362 are formed and substituted into the original query 302 to form the transformed query.

Figure 4:
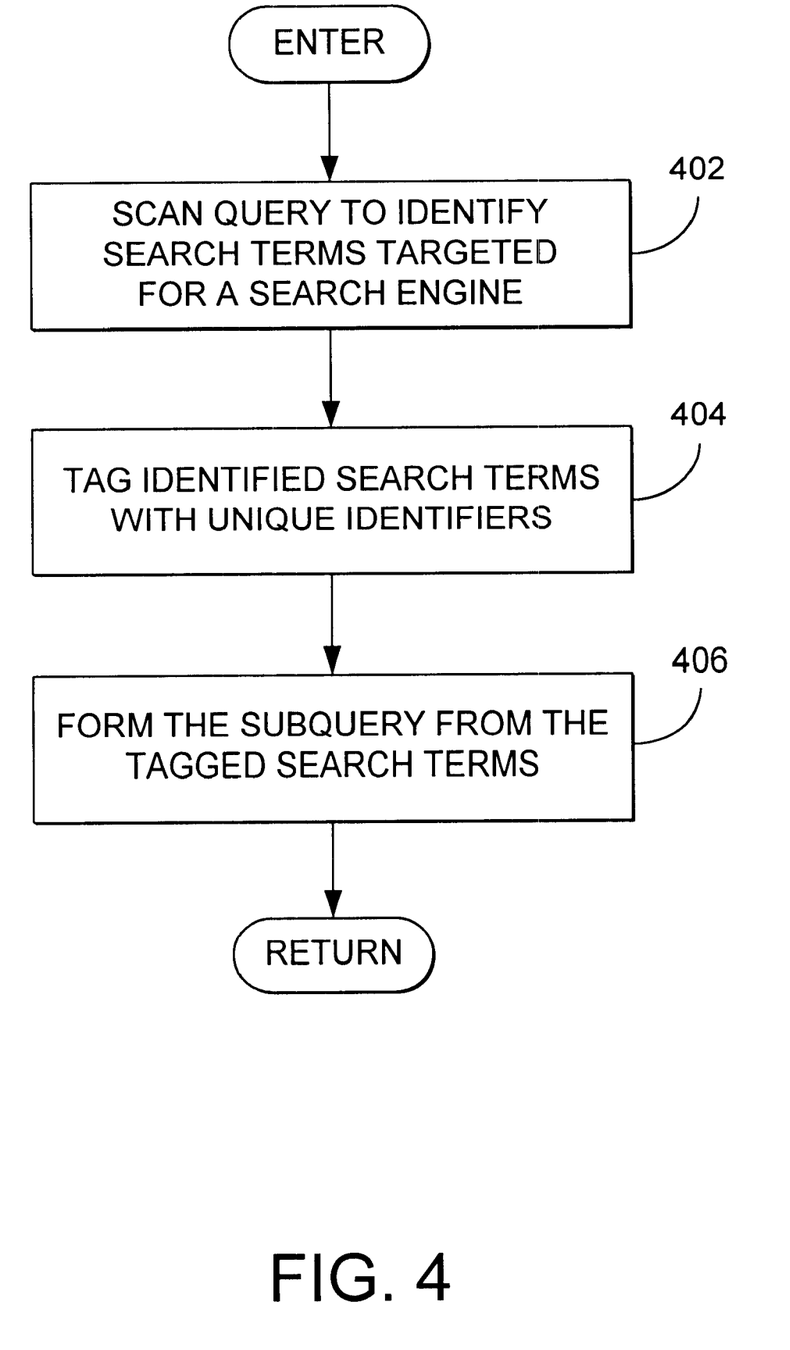
FIG. 4 is a flow chart illustrating exemplary process steps used to form subqueries from the query.

FIG. 4 is a flow chart illustrating exemplary process steps used in forming subqueries 336 from the query 302. First, the query 302 is scanned 402 to identify search terms 308–314, 318–324, and 328–334 that are targeted for a particular search engine. Identified search terms 308–314, 318–324, and 328–334 are then tagged 404 with unique identifiers. These unique identifiers are used to form 406 the subquery 336 from the tagged search terms. If desired, the foregoing process can be completed to form subqueries for all of the conditions in the original query before executing the subqueries. In this case, when the process is complete, the original query 302 will have been used to form a number of subqueries 336, each formulated to be sent to a particular search engine. Alternatively, subqueries can be formed, executed, and the results obtained substituted in the original query one at a time.

Figure 5:
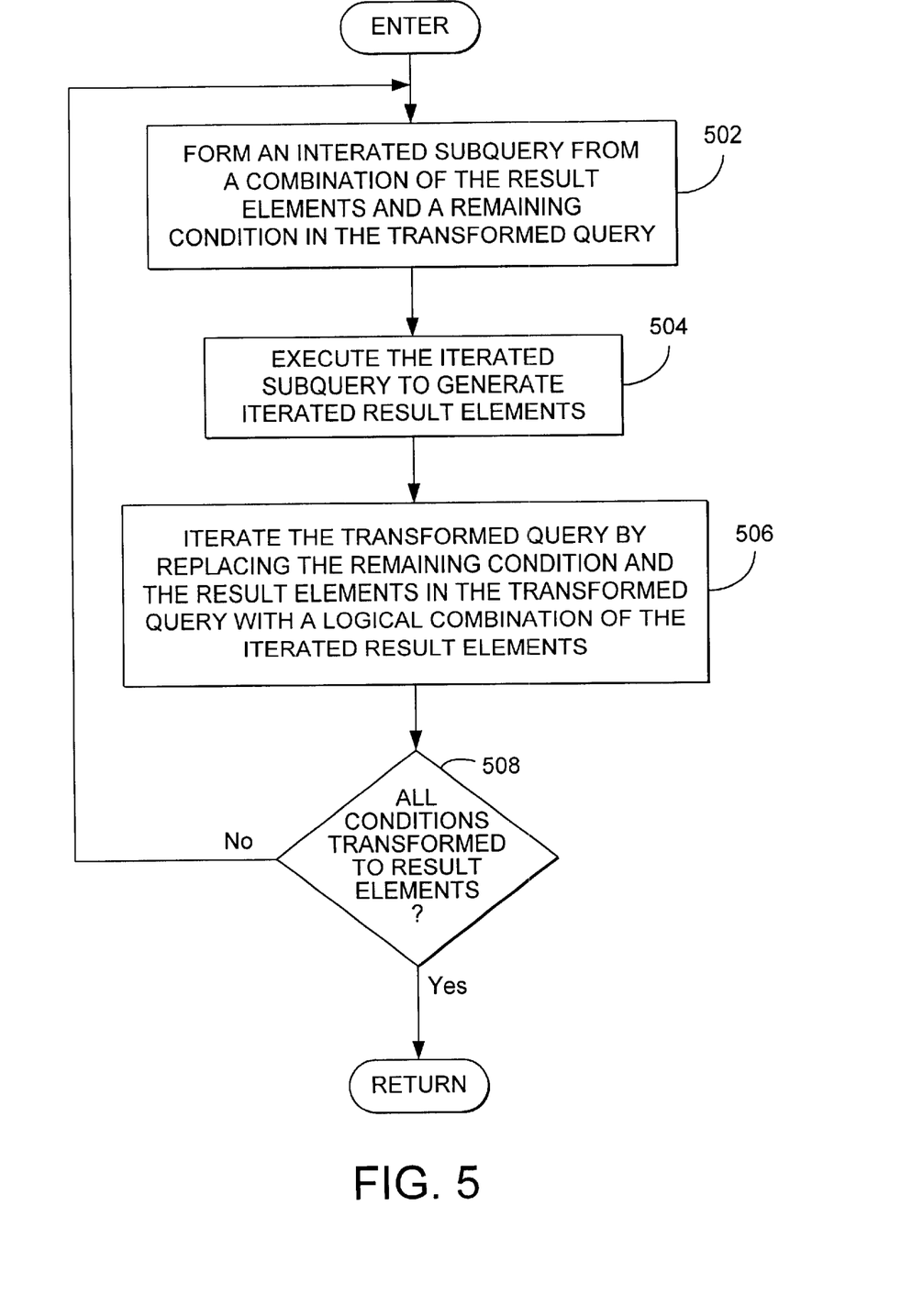
FIG. 5 is a flow chart illustrating exemplary process steps used to transform a query with a plurality of conditions in a cascaded manner.
Figure 6A:
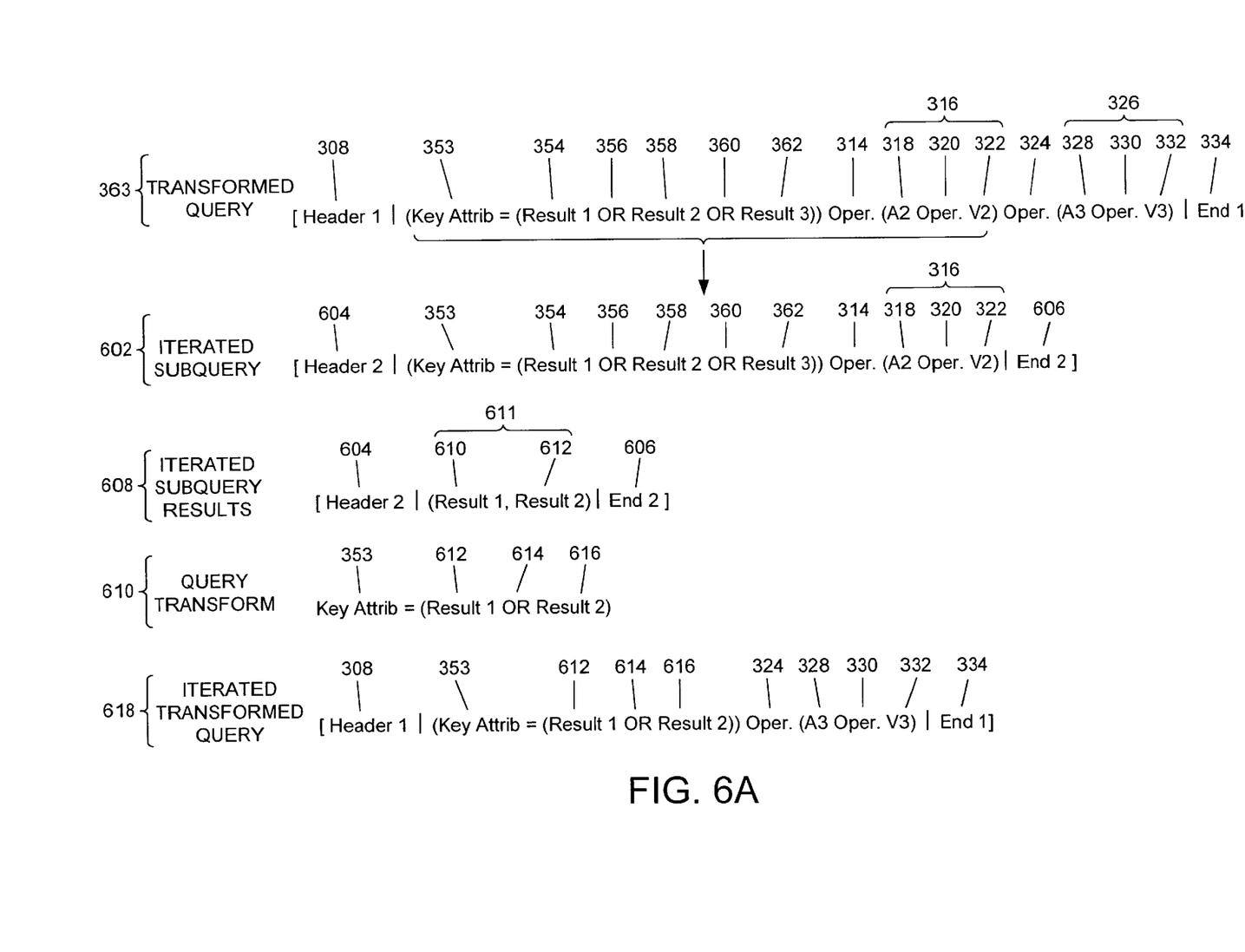
FIG. 6A is a diagram presenting an illustration of the cascaded transformation of a query with a plurality of conditions.

FIGS. 5 and 6A are diagrams showing cascaded processing of other subqueries 336 that have been defined for query 302. FIG. 5 is a flow chart illustrating exemplary process steps, and FIG. 6A is a diagram presenting an illustrative example of the application of the process steps to a query. First, an iterated subquery 602 is formed 502 from a combination of the result elements 354, 358, and 362 and a remaining condition (such as the conditions 316 and 326 that remain in the transformed query 363). This can be accomplished by scanning the transformed query 363 to identify search terms 318–322, and 328–332 that are tagged for other search engines. Terms so identified can be tagged with unique identifiers to form other subqueries 336 from the original query 302.

The iterated subquery 602 is then executed 504 by a search engine to generate an iterated result list 611 having iterated result elements 610 and 612. Next, the transformed query 363 is iterated 506, thus forming an iterated transformed query 618. This is accomplished by replacing the remaining condition 316 and the result elements 354, 356, 358, 360, and 362 in the transformed query 363 with a logical combination of the iterated result elements 610 and 612 and, if necessary, a key attribute 353. The foregoing process is continued until all conditions have been transformed into result elements, as shown in block 508. In one embodiment of the invention, all conditions in the query are not transformed into result elements for eventual substitution into the query. Rather, the foregoing is only performed for those query conditions with search terms targeted to specialized search engines.

Figure 6B:
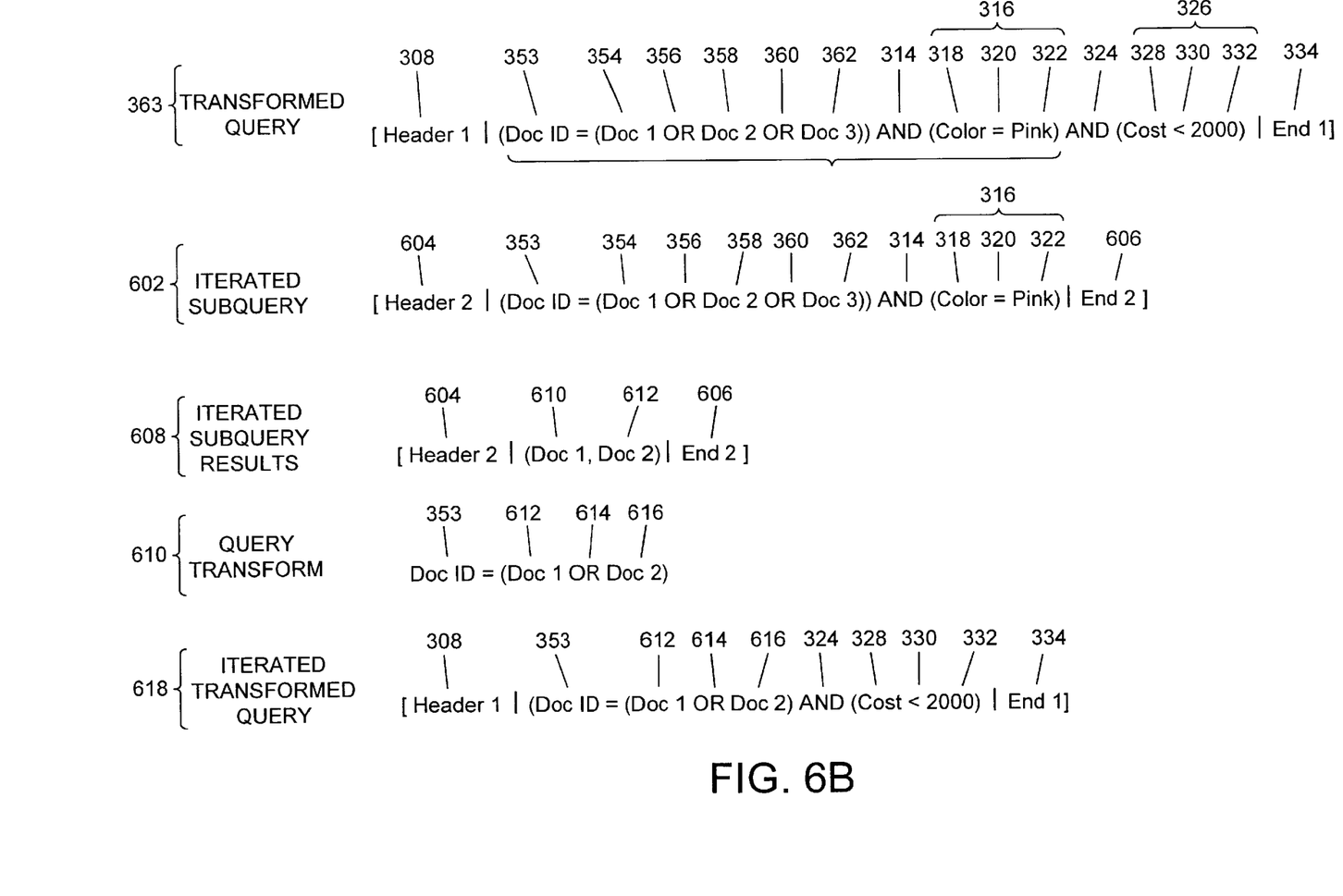
FIG. 6B is a diagram presenting an example of a cascaded transformation.

FIG. 6B is a diagram showing a specific example of the operations depicted in FIGS. 5 and 6A. In this example, as with the example depicted in FIG. 3B, the user has entered a query to find pink sculptural items produced by all artists named Smith that cost less than $2,000. A transformed query 363 has been derived using an executed sub query 336 for the first condition 306 in the query. Now, an iterated subquery 602 is formed 502 from a combination of result elements 354, 358, and 362 (here, a document identification or ID number) and a remaining condition 316. The iterated subquery is then executed 504 by a search engine to generate an iterated result list having iterated result elements 610 and 612. The transformed query 363 is then iterated by replacing the remaining condition 316 (Color=Pink) and the result elements in the transformed query 363 with a logical combination of the iterated result elements 610 and 612. The result of the foregoing steps is an iterated transformed query 618, which can be combined in accordance with the principles, set forth above, and executed in another search engine, such as is available on a Z39.50 compliant server.

In the foregoing example, operator 314 was an "AND" operator. Hence, the second condition 316 was combined with the result elements 354, 358, and 362 before sending the iterated subquery to the search engine for execution. In cases where operator 314 is an "OR" operation, a subquery formed from condition 316 may be sent directly to the search engine for execution. The result elements obtained from the execution of this subquery can then be logically combined with result elements 354, 358, and 362. When the operator 314 is an "AND" operator, such as the example presented in FIG. 6B, generating an iterated subquery 602 having a logical combination of the result elements 354, 358, and 362 and the subquery formed from condition 316 reduces the number of times the search engine must be called to execute the iterated subquery 602.

Figure 7:
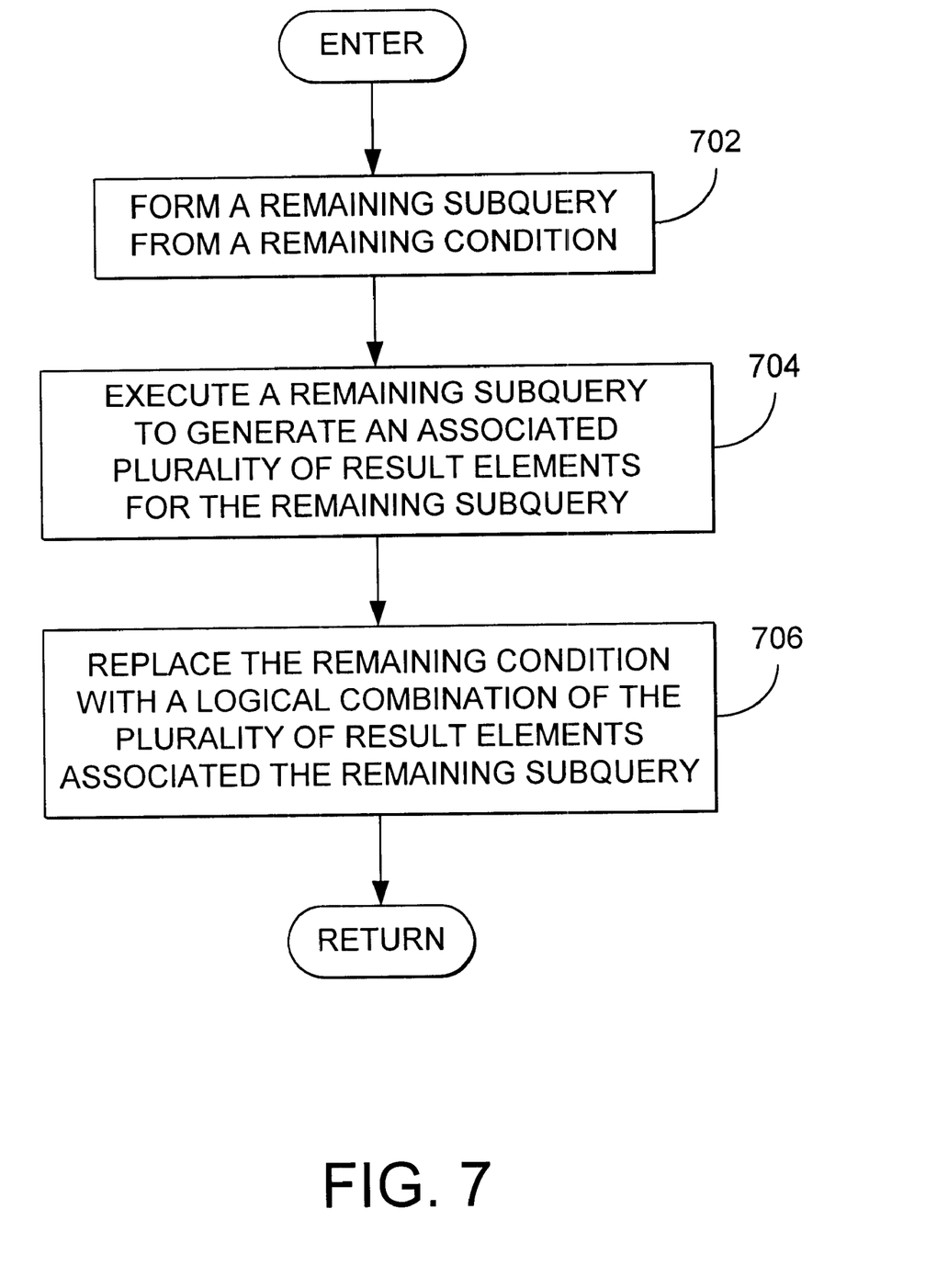
FIG. 7 is a flow chart illustrating exemplary process steps use to transform a query with a plurality of conditions in a parallel manner.
Figure 8:
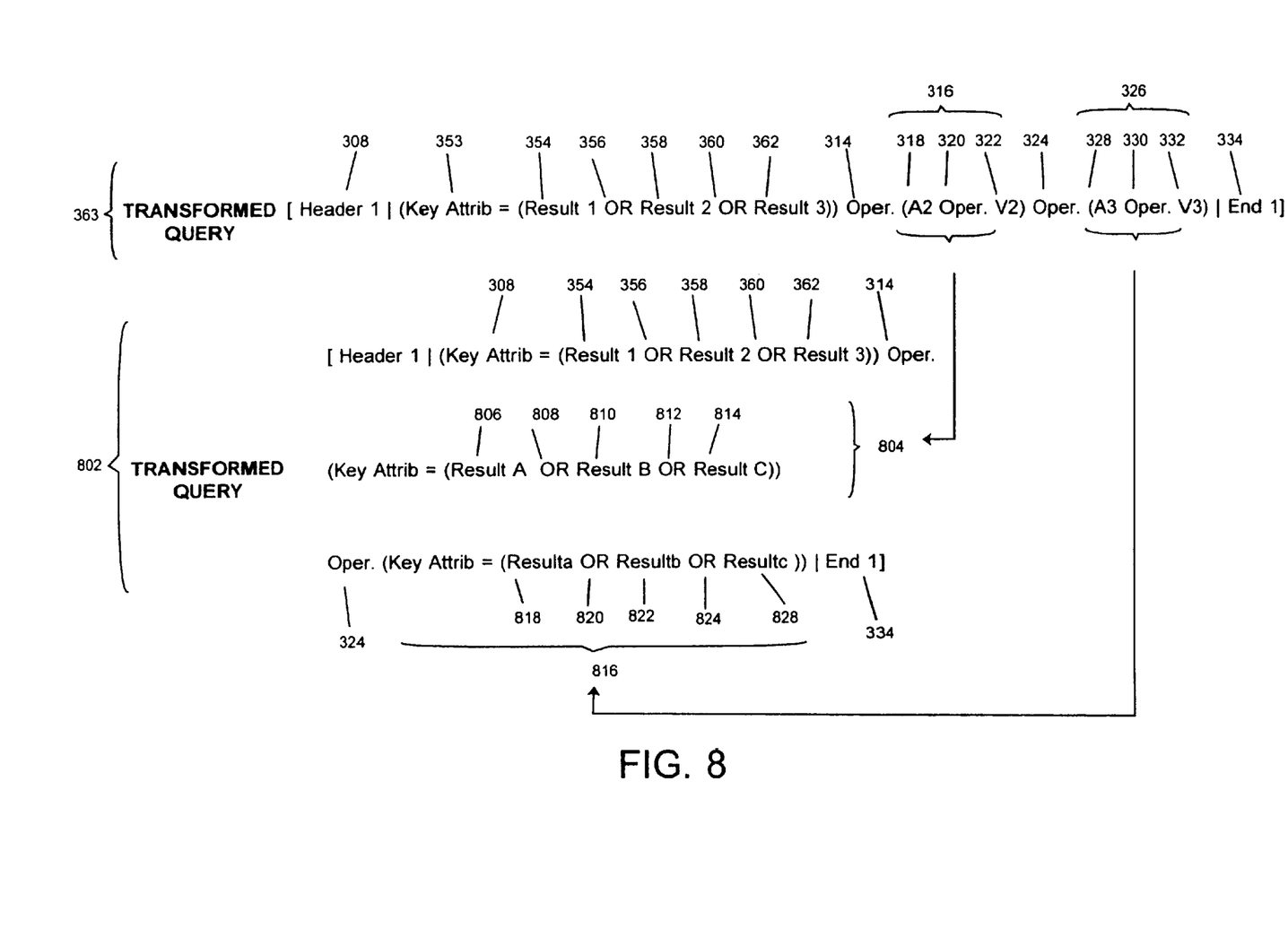
FIG. 8 is a diagram presenting an example of a parallel transformation of a query with a plurality of conditions.

FIG. 7 and 8 are diagrams showing parallel processing of other subqueries 336 that have been defined for the query 302. FIG. 7 is a flow chart illustrating exemplary process steps, and FIG. 8 is a diagram presenting an illustrative example of the application of the process steps to a query. First, a subquery is formed 702 from a one or more of the remaining conditions 316 and 326 in the original query 302. Then, the formed subqueries are executed 704 as described above to generate an associated plurality of result elements. In the example shown in FIG. 8, result elements 806, 810, and 814 were generated from the second condition 316, and result elements 818, 822, and 828 were generated from the third condition 326. Then, the remaining conditions 316 and 326 in the original query 302 are replaced 706 by a logical combination of the result elements generated for the conditions to form a transformed query 802.

Conclusion

This concludes the description of the preferred embodiments of the present invention. In summary, the present invention describes a method, apparatus, article of manufacture, and memory structure for transforming a query to reduce the need for merging results from a number of result lists.

The method comprises the steps of forming at least one subquery from the query, executing the formed subquery to generate a result list comprising a plurality of first result elements, and replacing the executed subquery with a logical combination of the first result elements to form a transformed query. In one embodiment of the invention, the query comprises a number of search terms, and the step of forming a subquery comprises the steps of scanning the query to identify search terms targeted for a search engine, tagging the identified search terms with unique identifiers, and forming the subquery from the tagged search terms. In another embodiment, the tagged search terms are those which are targeted for specialized search engines, such as those optimized for text searching or image analysis, and the tag and unique identifier associated with each search term provides an indication of the specialized search engine the search term is targeted to. In another embodiment of the invention, substitution of result elements for subqueries proceeds in cascaded fashion by combining the result elements with a remaining subquery, one at a time to generate iterated result elements. This process is completed until all subqueries in the query have been processed. In another embodiment of the invention, substitution of the result elements for subqueries proceeds in parallel.

In accordance with the foregoing, the present invention also comprises an apparatus having a means for forming at least one subquery from the query, a means for executing the formed subquery to generate a plurality of first result elements, and a means for replacing the executed subquery with a logical combination of the first result elements to form a transformed query. In another embodiment, the invention comprises a program storage device, tangibly embodying a sequence of instructions for performing the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transforming a query comprising a plurality of conditions, comprising the steps of:
    (a) forming at least one subquery from a condition in the query, wherein the condition comprises at least one search term targeted for a specialized search engine;
    (b) executing the formed subquery in the specialized search engine to generate a plurality of first result elements; and
    (c) replacing the condition in the query with a logical combination of the first result elements and at least one remaining condition in the query to form a transformed query.

2. The method of claim 1, further comprising the steps of:
    (d) forming an iterated subquery from a combination of the result elements and the remaining condition in the transformed query;
    (e) executing the iterated subquery to generate iterated result elements; and
    (f) iterating the transformed query by replacing the remaining condition and the result elements in the transformed query with a logical combination of iterated result elements.

3. The method of claim 2, further comprising the step of repeating steps (d)–(f) for all of the remaining conditions in the transformed query.

4. The method of claim 1, wherein the method further comprises the steps of:
    (d) forming a remaining subquery from the remaining condition;
    (e) executing the remaining subquery to generate an associated plurality of result elements for the remaining subquery; and
    (f) replacing the remaining condition with a logical combination of the plurality of result elements associated with the remaining subquery.

5. The method of claim 4, further comprising the step of repeating steps (d)–(e) for all of the remaining conditions in the query.

6. The method of claim 5, wherein each subquery is executed by a different search engine than the other subqueries.

7. The method of claim 1, wherein the first result elements are logically combined in the query with the remaining condition in the query by a logical OR operation.

8. An apparatus for transforming a query comprising a plurality of conditions, comprising:
    (a) means for forming at least one subquery from a condition in the query, wherein the condition comprises at least one search term targeted for a specialized search engine;
    (b) specialized search engine means for executing the formed subquery to generate a plurality of first result elements; and
    (c) means for replacing the condition in the query with a logical combination of the first result elements and at least one remaining condition in the query to form a transformed query.

9. The apparatus of claim 8, further comprising:
    (d) means for forming an iterated subquery from a combination of the result elements and the remaining condition in the transformed query;
    (e) means for executing the iterated subquery to generate iterated result elements; and
    (f) means for iterating the transformed query by replacing the remaining condition and the result elements in the transformed query with a logical combination of iterated result elements.

10. The apparatus of claim 9, further comprising means for repeatedly forming an iterated subquery from a combination of the result elements and the remaining condition in the subquery, executing the iterated subquery to generate iterated result elements, and iterating the transformed query by replacing the remaining condition and the result elements in the transformed query with a logical combination of the iterated result elements for the remaining conditions in the transformed query.

11. The apparatus of claim 8, further comprising:
    (d) means for forming a remaining subquery from the remaining condition;
    (e) means for executing the remaining subquery to generate an associated plurality of result elements for the remaining subquery; and
    (f) means for replacing the remaining condition with a logical combination of the plurality of result elements associated with the remaining subquery.

12. The apparatus of claim 11, further comprising means for repeatedly forming a remaining subquery from the remaining condition, executing the remaining subquery to generate an associated plurality of result elements for the remaining subquery, and replacing the remaining condition with a logical combination of the plurality of result elements associated with the remaining subquery for the remaining conditions in the query.

13. The apparatus of claim 12, wherein each subquery is executed by a different search engine than the other subqueries.

14. The apparatus of claim 8, wherein the first result elements are logically combined in the query with the remaining condition in the query by a logical OR operation.

15. A program storage device, readable by a computer having a processor, a memory and a data storage device, tangibly embodying one or more programs of instructions executable by the computer to perform method steps of transforming a query comprising a plurality of conditions, the method steps comprising the steps of:
    (a) forming at least one subquery from a condition in the query, wherein the condition comprises at least one search term targeted for a specialized search engine;
    (b) executing the formed subquery on the specialized search engine to generate a plurality of first result elements; and
    (c) replacing the condition in the query with a logical combination of the first result elements and at least one remaining condition in the query to form a transformed query.

16. The program storage device of claim 15, wherein the method steps further comprise the method steps of:
  (d) forming an iterated subquery from a combination of the result elements and the remaining condition in the transformed query;
  (e) executing the iterated subquery to generate iterated result elements; and
  (f) iterating the transformed query by replacing the remaining condition and the result elements in the transformed query with a logical combination of iterated result elements.

17. The program storage device of claim 16, wherein the method further comprises the method step of repeating method steps (d)–(f) for all of the remaining conditions in the transformed query.

18. The program storage device of claim 15, wherein the method steps further comprise the steps of:
  (d) forming a remaining subquery from the remaining condition;
  (e) executing the remaining subquery to generate an associated plurality of result elements for the remaining subquery; and
  (f) replacing the remaining condition with a logical combination of the plurality of result elements associated with the remaining subquery.

19. The program storage device of claim 18, wherein the method steps further comprise the step of repeating steps (d)–(e) for all of the remaining conditions in the query.

20. The program storage device of claim 19, wherein each subquery is executed by a different search engine than the other subqueries.

21. The program storage device of claim 15, wherein the first result elements are logically combined by a logical OR operation.

22. The method of claim 1, wherein the each condition comprises at least one search term, and the step of forming at least one subquery from a condition comprises the steps of:
  scanning the query to identify search terms targeted for a search engine;
  tagging the identified search terms with unique identifiers; and
  forming the subquery from the tagged search terms.

23. The apparatus of claim 8, wherein the each condition comprises at least one search term, and the means for forming at least one subquery from a condition comprises:
  means for scanning the query to identify search terms targeted for a search engine;
  means for tagging the identified search terms with unique identifiers; and
  means for forming the subquery from the tagged search terms.

24. The program storage device of claim 15, wherein the each condition comprises at least one search term, and the step of forming at least one subquery from a condition comprises the method steps of:
  scanning the query to identify search terms targeted for a search engine;
  tagging the identified search terms with unique identifiers; and
  forming the subquery from the tagged search terms.

* * * * *